United States Patent [19]

Butcher, Jr. et al.

[11] Patent Number: 5,438,078
[45] Date of Patent: Aug. 1, 1995

[54] METHOD FOR DEPOLYMERIZATION OF RUBBER

[75] Inventors: Jared A. Butcher, Jr., Athens, Ohio; Huw Kidwell, West Glam, United Kingdom

[73] Assignee: Ohio University, Athens, Ohio

[21] Appl. No.: 183,016

[22] Filed: Jan. 18, 1994

[51] Int. Cl.$^6$ ............... C08C 19/08; C08F 8/18; C08J 11/18
[52] U.S. Cl. ............... 521/41; 521/40.5; 521/46; 525/332.3; 525/359.1; 525/359.3; 525/359.5; 525/938
[58] Field of Search ............... 521/41, 40.5, 46; 525/332.3, 359.1, 359.3, 359.5, 938

[56] References Cited

U.S. PATENT DOCUMENTS 3,968,316  7/1976  Jyo et al. ............... 428/492

Primary Examiner—Paul R. Michl
Assistant Examiner—Olga Asinovsky
Attorney, Agent, or Firm—John L. Gray; Patricia L. Prior

[57] ABSTRACT

The present invention is a method for depolymerizing organic vulcanized rubber which contains at least one organic component. In broadest terms, the method of the present invention comprises the steps of: (a) obtaining a portion of organic vulcanized rubber to be recycled; (b) treating the portion of rubber with an effective amount of:

(1) a solution of at least one organic hypochlorite; and
(2) at least one organic solvent; for sufficient time and at sufficient temperature whereby substantially all of the portion of the rubber is degraded to an extent so as to be dispersed in the organic solvent, whereby the organic component(s) is/are extracted therefrom.

The organic vulcanized rubber (such as rubber from used tires and/or other waste sources) may be from a single source or from various sources, and those from various sources may even be comingled for treatment by the present method.

19 Claims, No Drawings

METHOD FOR DEPOLYMERIZATION OF RUBBER

TECHNICAL FIELD

The present invention is in the field or rubber degradation methods, such as methods those used for the recycling of rubber.

BACKGROUND

Rubber in its many forms presents many problems when it must be depolymerized, such as for the purposes of recycling.

For instance, scrap tires represent a large problem in an environmentally conscious world. In the United States and Canada alone, it is estimated that around 260 million tires are discarded annually. Clearly there is a need for a cost effective, environment preserving tire degradation process. Recycling tires is a manifold problem which includes the following factors:

1) Tires stored in dumps and landfills create general health and a hazardous waste problems. Tire dumps provide breeding grounds for pests, such as mosquitoes. Tire dump fires are extremely dangerous, they require a large amount of manpower to extinguish if indeed they can be quenched at all before burning completely. These fires also discharge toxic gas into the atmosphere.

2) The automobile tire is a complex structure consisting of not only rubber of several types, but also polyethylene pterphthalate, sulfur, polyester and fiberglass cords, steel belts and cords, copper and carbon black. Separation of these component parts presents a serious problem when recycling tires, as the component parts are of various physical and chemical character.

3) Markets must be made available for recycled materials from tires. Examples of products from recycled tires presently include: rubber crumb filler, rubber modified asphalt, and fuel chips. The steel belts and cords might also be reused by the tire manufacturers in one form or another, or otherwise be recycled as scrap metal.

Other sources of scrap rubber include industrial and laboratory waste, and waste medical supplies. Types of rubber include butadiene rubber and isoprene rubber.

At present, many tire recycling processes involve grinding up tires, or freezing the tires with liquid nitrogen before crushing and shattering them into smaller fragments. Various separation processes to remove components, such as steel fragments, are then carried out, usually by magnetic means. The rest of the particles are sieved and graded according to size, often ground to a smaller mesh, and then sold for various purposes.

Another obstacle to the efficient depolymerization of rubber is the relatively inert chemical nature of rubber itself. Rubber is generally formulated to resist environmental degradation and thus resists chemical attack designed to liberate its chemical components. Consequently, rubber has generally been disposed of by burning due to the inability to provide acceptable chemical recycling means which can proceed without the application of very strong reagents and/or large amounts of energy. Therefore it is desirable to provide a method for the efficient chemical depolymerization of rubber to render it into separate component fractions more suitable for reuse.

Yet another major hurdle to be overcome in the recycling of rubber is that presented by the wide variety of the chemical components contained in the many types of rubber, including those in vulcanized tire rubber. Such components include the polymeric components, as well as vulcanizing agents, cross-linking agents, antioxidants, carbon black, etc. Accordingly, it is difficult to formulate methods for depolymerizing rubber which will both be able to separate the rubber components while being able to operate in an environment of several varied chemical species, without the depolymerization reaction being adversely affected thereby, and without undesirable side reactions.

Thus it is desirable to use methods for recycling rubber which may be applied efficiently and inexpensively, and which render the rubber into useful chemical components.

The many embodiments of the present invention make progress toward the accomplishment of the above objectives and toward providing solutions to the problems discussed above. In light of the present disclosure and/or the practice of the present invention, other advantages and/or the solution to additional problems, may become apparent to one skilled in the relevant arts.

SUMMARY OF THE INVENTION

The present invention is a method for depolymerizing organic vulcanized rubber which contains at least one organic component. In broadest terms, the method of the present invention comprises the steps of: (a) obtaining a portion of organic vulcanized rubber to be recycled; (b) treating the portion of rubber with an effective amount of:

(1) a solution of at least one organic hypochlorite; and (2) at least one organic solvent; for sufficient time and at sufficient temperature whereby substantially all of the portion of the rubber is degraded to an extent so as to be dispersed in the organic solvent, whereby the organic component(s) is/are extracted therefrom.

The organic vulcanized rubber (such as rubber from used tires and/or other waste sources) may be from a single source or from various sources, and those from various sources may even be comingled for treatment by the present method.

The method of the present invention may be carried out either by treating the portion of rubber is simultaneously treated with the solution the organic hypochlorite(s) and the organic solvent(s), or by first treating the portion of rubber with the solution of the organic hypochlorite(s), followed by treatment of the portion of rubber with the organic solvent(s). It is preferred that the organic solvent(s) is/are refluxed during the treatment of the portion of rubber with the organic solvent(s).

The organic hypochlorite(s) used in accordance with the present invention is/are preferably selected from the group of tertiary hypochlorites (as primary and secondary hypochlorites can be dangerously explosive), such as t-butyl hypochlorite and amyl hypochlorite. The preferred hypochlorite for use in the present invention is t-butyl hypochlorite ($C_4H_9OCl$), preferably in a solution in the range of from about 2% to 10% by weight and most preferably about 5% by weight.

Due to the highly reactive nature of hypochlorites, particularly, t-butyl hypochlorite, it is preferred that the treatment of the portion of rubber with the organic hypochlorite(s) is carried out substantially in the absence of light, and preferably in the dark.

When a sample of rubber is put into contract with t-butyl hypochlorite, it undergoes changes in its mechanical properties. The reaction with rubber is highly exothermic and extreme caution is needed when carrying out this type of reaction. On a larger scale temperature control is essential. In this regard, the reactions of this type should have their temperature maintained at a sufficient temperature to allow the reaction to proceed, such as at temperatures in the ranges disclosed herein. Because the reaction of the hypochlorite is exothermic, the maintenance of the temperature normally will involve cooling the reaction vessel to prevent the temperature from becoming too high (which can lead to premature decomposition of the hypochlorite) t rather than heating the reaction vessel to prevent the temperature from falling below a range where reaction occurs.

The organic solvents which may be used in accordance with the present invention may be any organic solvent that will enter the rubber such as those solvents which cause the rubber to "swell." Such solvents include those selected from the group consisting of t-butyl methyl ether, acetone, tetrahydrofuran (THF) and mixtures thereof. Where the portion of rubber is treated simultaneously with the solution the organic hypochlorite(s) (preferably t-butyl hypochlorite) and the organic solvent(s), the preferred organic solvent comprises t-butyl methyl ether. Where the method of the present invention comprises first treating the portion of rubber with the solution of the organic hypochlorite (again preferably t-butyl hypochlorite), followed by treatment of the portion of rubber with the organic solvent(s), it is preferred that the organic solvent organic solvent comprises acetone.

The method of the present invention facillitates the depolymerization of organic vulcanized rubber, and may be used in the recycling of organic component(s) as well as the fibers (i.e. PETE, fiberglass and nylon) and cords (i.e. nylon, polyester and steel), contained therein.

DETAILED DESCRIPTION OF THE PREFERRED EMBODIMENTS

In accordance with the foregoing summary, the following presents a detailed description of the preferred embodiments of the present invention, which are presently considered the best mode of practicing the invention.

This experiment used "standard" samples, the production of which is discussed in the "Solvent Effects" section, and show that over a two hour period a 4.32 g rubber sample absorbed 1.11 g of t-butyl hypochlorite at room temperature. Similarly a 4.51 g rubber sample absorbed 1.91 g of t-butyl hypochlorite over a five hour period at room temperature.

Synthesis of t-Butyl Hypochlorite

The synthesis of t-butyl hypochlorite is very simply carried out by using the method of Mintz and Walling, Organic Syntheses, Volume 5, especially page 184, which is hereby incorporated herein by reference. This synthesis involves the use of commonly available reagents, such as 5% sodium hypochlorite solution, butyl alcohol, and glacial acetic acid (although the synthesis of the t-butyl hypochlorite may also be carried out using dilute acetic acid with a slight reduction in yield. The procedure was as follows: In a conical flask of about 1-2 liter capacity is placed 500 ml of household bleach (5% hypochlorite solution). The flask is placed in an ice pail and stirred rapidly until the temperature falls below 5° C. The rest of the procedure can be carried out safely by using illumination provided by a 7.5 Watt red light bulb or in the dark, but it cannot be carried out with full lighting as the product decomposes rapidly in bright light and may actually explode. A solution of 37 ml of t-butyl alcohol and 25 ml of glacial acetic acid is added to the flask in one portion and stirring continued for about 5 minutes. At the end of this time, the contents of the flask are poured into a large separatory funnel and allowed to settle until two layers can be seen. The upper layer, which is the organic layer, is the product. The two layers are separated and the organic layer is washed with 10% aqueous sodium carbonate several times, and then washed with distilled water several times. The t-butyl hypochlorite can then be dried over calcium chloride, and stored in amber bottles in the refrigerator. The yield of the product, which does not require further purification, is about 95%. Extreme caution must be exercised when carrying out reactions with t-butyl hypochlorite since it reacts violently on exposure to ultraviolet light and it may react violently if heated above its boiling point, which is 79.6° C.

Solvent Effects

The degradation of tire rubber by t-butyl hypochlorites produced a black hard solid. To study this reaction further, the black solid was treated with a variety of organic solvents in an attempt to dissolve it. The most successful experiments involved t-butyl methyl ether and acetone. By using these two solvents it was possible to separate a brown residue from the black solid. The only difference between the two being that the acetone required reflux with the black solid, whereas the t-butyl methyl ether could separate the two components at room temperature.

Two ways of carrying out the reaction were tried. In the first, t-butyl hypochlorite was reacted with the tire rubber alone and the resulting solid treated with solvent. In the second, t-butyl hypochlorite and rubber were allowed to react in the solvents mentioned above. The difference was worthy of note. If the treated solid was refluxed in acetone for about 30 minutes a brown material dissolved in acetone, and the solid crumbled into pieces. However, if the reaction itself was carried out in the solvent, the black solid took on jelly-like properties. Control experiments were set up using just solvent and rubber samples, and it was found that some brown material could be liberated from the rubber without using t-butyl hypochlorite. The control experiments also showed that rubber soaked in t-butyl methyl ether could be pulled apart and torn into pieces for a period of about 8-10 hours, after which their rubber-like elasticity returned. Specifically, the data showed that a "standard" 4.28 g sample of rubber after soaking at room temperature in t-butyl methyl ether for 8 hours absorbed 1.43 g of solvent. The samples treated in this way were seen to swell up in all their dimensions. The treated samples could be snapped and pulled apart, but not as easily as if they had been treated by t-butyl hypochlorite as well.

The "standard" samples used in these experiments were taken from a large black rubber stopper because tires could not provide the uniformity required. The samples were prepared by using a cork borer to cut out a rod from a No 14 black rubber stopper. The resulting samples weighed between 4.25 g and 4.62 g, the dimensions were about 10 mm in diameter and 40 mm in length.

Mechanical Tests on Rubber Samples

The effects of t-butyl hypochlorite and solvent on rubber had to be put into quantitative terms by using some mechanical test on the treated rubber. This was achieved through the use of a Tinius Olsen, series 1000 Universal Testing Machine. The testing machine consisted of a 300 Watt single phase stepping electric motor, connected via a thread arrangement to two wedge shaped vice grip jaws with serrated contact surfaces to grip the sample. Force was applied and the extension measured as the samples were stretches, a plot of these data was used to characterize the elasticity of the sample. The "standard" samples previously described were not compatible with the machine because the vice-like grips into which the samples had to be loaded could not grip the untreated rubber for the duration of the test, and would actually crush the treated rubber samples. Various methods were tried to hold the "standard" rubber sample but they were all to no avail. So, a new standard sample had to be adopted.

An "O" ring made of black polybutadiene rubber was then used as standard for mechanical testing. Its dimensions were 24.5 mm outside diameter and 20.0 mm internal diameter so that the round cross section of the rubber had a diameter of about 2.25 mm. Special jigs had to be designed and constructed to hold the sample while it was under tension. These took the form of two "U" shaped loops of steel wire about 3 mm in thickness and round cross section, one for each vice grip of the testing machine. The loops were padded with rubber at the bend to prevent them from cutting into the sample but were not padded at the ends which fitted into the jaws since this might have caused them to slip. This method was adopted since very little preparation had to be done to the sample before measurement.

The tensile strength was measured for various samples. The first was an untreated, rubber "O" ring. This experiment helped define the maximum force and extension needed for subsequent experiments and it defined the reference plot of force in Newtons against extension in millimeters. This provided a bench mark against which the curves characterizing other samples could be compared. Rubber "O" rings which had been treated with t-butyl hypochlorite alone for 15 minutes were tested. Finally, samples treated with t-butyl methyl ether alone for one hour were tested. These experiments allowed the effect of both the t-butyl hypochlorite and t-butyl methyl ether to be quantified against a measurable property of the rubber. The results can be seen displayed in FIGS. 1 and 2. FIG. 1 contains curves 1 showing the force extension curves of untreated O-rings, and curves 2 showing the force extension curves of O-rings treated in accordance with the present invention with t-butyl hypochlorite. FIG. 2 contains curves 3 showing the force extension curves of O-rings treated in accordance with the present invention with t-butyl methyl ether.

The results clearly show that rubber loses mechanical strength on exposure to t-butyl hypochlorite. It can also be seen that, when using the solvent t-butyl methyl ether alone, rubber undergoes a loss of mechanical strength and a change in the stretching characteristics when compared to untreated rubber. There are limitations to this method of testing the rubber samples since the compression factor of the rubber pads on the stretch "jigs" is not taken into account, but this factor is assumed to be a constant throughout the mechanical testing of the samples. The samples tested in this way gave consistent breaking strain values and force vs. extension curves.

NMR Studies of the Products

Consistent with all the samples of rubber used in the foregoing experiments, the products obtained were a black solid and a brown residue which could be extracted from the solid with a solvent such as acetone or t-butyl methyl ether. The black solid, when it was free of solvent, was of a consistency not unlike coal, insofar as it would crumble in the same way, and the brown residue was of a sticky consistency. Aside from this, the tire samples themselves released white fibers which were shown to be polyethylene pteraphthalate by solids NMR. The products obtained, the black solid and the brown residue, were shown to be very complex mixtures by using NMR. The NMR experiments were carried out using a 400 Mhz Varian VXR-5000 spectrometer. Carbon-13 solids NMR by Bloch decay on untreated rubber tire (FIG. 3) showed singlets at 143, 136, 130, 126, and 115 ppm consistent with the carbon-carbon double bond present in polybutadiene. This compound is responsible for the elastic properties of rubber. A broad feature in the base line centered at about 110 ppm is attributed to carbon black in the tire. The remaining singlets at 44, 28, 32, 30, 26, and 23 ppm characteristic of saturated carbons were also present.

Spectra obtained for the black solid after the removal of the brown reside, FIG. 4, exhibited no peaks indicating carbon-carbon double bonds, the broad feature in the base line remained, and some small singlet peaks at 70, 60, 38, and 30 ppm. The peak at 30 ppm was thought to be the remnants of acetone used to extract the brown residue. From the NMR a complete alternation in the structure of the rubber can be seen. This correlates well with the change in the mechanical properties seen in earlier experiments. The NMR studies of the brown residue ($^1$H NMR) were not very informative.

Conclusion

It is clear from these results that a process could be developed to removed the rubber from tires on a commercial basis. The market exists for the black solid produced, as filler in road materials and other rubber products. The method of the present invention may thus have economic viability in the fields of tire destruction and rubber recycling.

In view of the foregoing disclosure and representative embodiments, it will be within the ability of one skilled in the chemical or chemical engineering art to make modifications and variations to the disclosed embodiments, including the use of equivalent materials and process steps without departing from the spirit of the invention.

What is claimed is:

1. A method of degrading an organic vulcanized rubber for the purpose of recycling the components thereof, said rubber containing at least one organic component, said method comprising the steps of:
   (a) obtaining a portion of organic vulcanized rubber to be recycled;
   (b) treating said portion of said rubber with an effective amount of:
      (i) a solution of at least one organic hypochlorite; and
      (ii) at least one organic solvent;

for sufficient time and at sufficient temperature whereby substantially all of said portion of said rubber is degraded to an extent so as to be dispersed in said organic solvent, whereby said at least one organic component is extracted therefrom.

2. The method according to claim 1 wherein said solution of at least one organic hypochlorite is selected from the group consisting of t-butyl hypochlorite and amyl hypochlorite.

3. The method according to claim 1 wherein said solution of at least one organic hypochlorite comprises a solution of t-butyl hypochlorite in the range of from about 2% to 10% by weight.

4. The method according to claim 1 wherein said organic solvent comprises a solvent selected from the group consisting of t-butyl methyl ether and acetone.

5. The method according to claim 1 wherein said at least one organic solvent comprises t-butyl methyl ether and acetone.

6. The method according to claim 1 whereinsaid treatment of said portion of said rubber is carried out by treating said portion of said rubber is simultaneously treated with said solution of at least one organic hypochlorite and said at least one organic solvent.

7. The method according to claim 6 wherein said solution of at least one organic hypochlorite is selected from the group consisting of t-butyl hypochlorite and amyl hypochlorite.

8. The method according to claim 6 wherein said solution of at least one organic hypochlorite comprises a solution of t-butyl hypochlorite in the range of from about 2% to 10% by weight.

9. The method according to claim 6 wherein said organic solvent comprises a solvent selected from the group consisting of t-butyl methyl ether and acetone.

10. The method according to claim 6 wherein said at least one organic solvent comprises t-butyl methyl ether and acetone.

11. A method of degrading organic vulcanized rubber for the purpose of recycling the components thereof, said rubber containing at least one organic component, said method comprising the steps of:
(a) obtaining a portion of organic vulcanized rubber to be recycled;
(b) treating said portion of said rubber with an effective amount of:
(i) a solution of t-butyl hypochlorite; and
(ii) an organic solvent selected from the group consisting of t-butyl methyl ether and acetone;

for sufficient time and at sufficient temperature whereby substantially all of said portion of said rubber is degraded to an extent so as to be dispersed in said organic solvent, whereby said at least one organic component is extracted therefrom.

12. The method according to claim 11 wherein said t-butyl hypochlorite is in a solution in the range of from about 2% to 10% by weight.

13. The method according to claim 11 wherein said t-butyl hypochlorite is in a solution of about 5% by weight.

14. The method according to claim 11 wherein said at least one organic solvent comprises t-butyl methyl ether and acetone.

15. The method according to claim 11 wherein said treatment of said portion of said rubber is carried out by treating said portion of said rubber is simultaneously treated with said t-butyl hypochlorite and said organic solvent is selected from the group consisting of t-butyl methyl ether and acetone.

16. The method according to claim 15 wherein said t-butyl hypochlorite is in a solution in the range of from about 2% to 10% by weight.

17. The method according to claim 15 wherein said t-butyl hypochlorite is in a solution of about 5% by weight.

18. The method according to claim 15 wherein said at least one organic solvent comprises t-butyl methyl ether and acetone.

19. A method of degrading organic vulcanized rubber for the purpose of recycling the components thereof, said rubber containing at least one organic component, said method comprising the steps of:
(a) obtaining a portion of organic vulcanized rubber to be recycled;
(b) treating said portion of said rubber with an effective amount of:
(i) a solution of about 5% by weight t-butyl hypochlorite; and
(ii) an organic solvent comprising t-butyl methyl ether and acetone;

for sufficient time and at sufficient temperature whereby substantially all of said portion of said rubber is degraded to an extent so as to be dispersed in said organic solvent, whereby said at least one organic component is extracted therefrom.

* * * * *